(12) United States Patent
Alghooneh et al.

(10) Patent No.: US 11,945,265 B2
(45) Date of Patent: Apr. 2, 2024

(54) SYSTEMS AND METHODS FOR ESTIMATING TIRE WEAR

(71) Applicants: GM GLOBAL TECHNOLOGY OPERATIONS LLC, Detroit, MI (US); University of Waterloo, Waterloo (CA)

(72) Inventors: Mansoor Alghooneh, Richmond Hill (CA); Joseph K. Moore, Whitby (CA); Christopher J. Mettrick, Whitby (CA); Gregory P. Kakert, Davisburg, MI (US); Amir Khajepour, Waterloo (CA); Amin Habibnejad Korayem, Waterloo (CA); Yechen Qin, Haidian District (CN); Ehsan Hashemi, Waterloo (CA)

(73) Assignee: GM Global Technology Operations LLC, Detroit, MI (US)

( * ) Notice: Subject to any disclaimer, the term of this patent is extended or adjusted under 35 U.S.C. 154(b) by 437 days.

(21) Appl. No.: 17/226,343

(22) Filed: Apr. 9, 2021

(65) Prior Publication Data
US 2022/0324266 A1    Oct. 13, 2022

(51) Int. Cl.
*B60C 11/24*        (2006.01)
(52) U.S. Cl.
CPC .................. *B60C 11/246* (2013.01)

(58) Field of Classification Search
CPC ..................................................... B60C 11/246
USPC ........................................................ 701/29.4
See application file for complete search history.

(56) References Cited

U.S. PATENT DOCUMENTS

| 10,696,108 B1* | 6/2020 | Alghooneh ......... B60C 23/0401 |
| 2020/0231010 A1* | 7/2020 | Carpenter ............. B60C 11/246 |
| 2023/0196854 A1* | 6/2023 | Lopez De La Cruz ..................... B60C 11/246 701/29.4 |

FOREIGN PATENT DOCUMENTS

| CN | 112292271 A | 1/2021 |
| CN | 112334335 A | 2/2021 |
| CN | 112440628 A | 3/2021 |
| EP | 3421267 A1 | 1/2019 |

* cited by examiner

*Primary Examiner* — Peter D Nolan
*Assistant Examiner* — Luke Huynh
(74) *Attorney, Agent, or Firm* — Quinn IP Law

(57) ABSTRACT

A method for determining a tire tread wear estimation of a tire includes receiving, by a controller, a direct tire tread wear measurement, when available, performing an indirect tire tread wear estimation, performing a data fusion of the indirect tire tread wear estimation with the direct tire tread wear measurement when available, estimating a percentage tire life remaining and a mileage to end of tire life, and estimating a refined tire tread wear calibration coefficient for performing future indirect tire tread wear estimations.

20 Claims, 3 Drawing Sheets

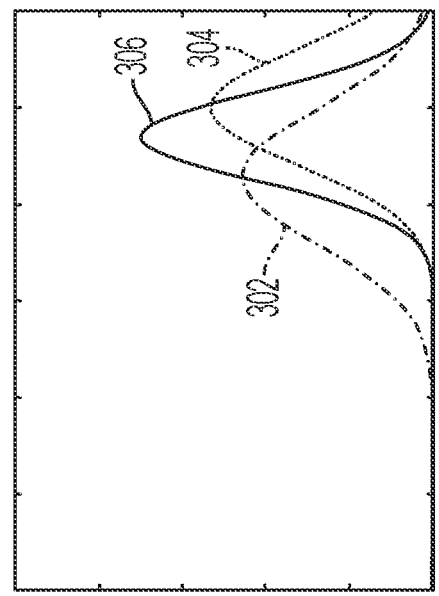
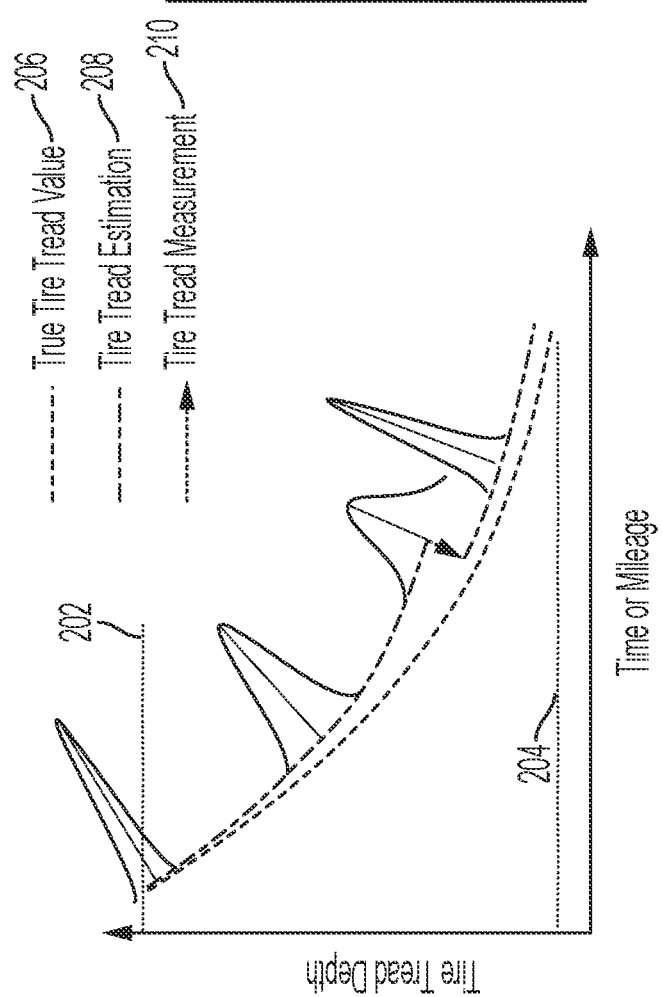

SYSTEMS AND METHODS FOR ESTIMATING TIRE WEAR

INTRODUCTION

The present disclosure relates generally to estimating tire tread wear at each corner of a vehicle in real time, using an indirect wear estimation and, when available, occasional direct wear measurement.

Tire tread wear has a significant influence on vehicle safety and dynamic vehicle performance. Tire tread wear can be measured directly or may be estimated using a combination of sensor data and tire information. However, these direct methods can be costly, due to the use of additional sensors.

SUMMARY

Embodiments according to the present disclosure provide a number of advantages. For example, embodiments according to the present disclosure provides an algorithmic framework that fuses occasional tire tread depth direct measurement with indirect tire tread depth estimation to enhance the accuracy of a tire tread depth calculation.

In one aspect of the present disclosure, a method for determining a tire tread wear estimation of a tire includes receiving, by a controller, sensor data from one or more vehicle sensors and receiving, by the controller, vehicle dynamics data from one or more vehicle system. The method also includes receiving, by the controller, a direct tire tread wear measurement, when available. The method further includes performing, by the controller, an indirect tire tread wear estimation using the sensor data and the vehicle dynamics data, performing, by the controller, a data fusion of the indirect tire tread wear estimation with the direct tire tread wear measurement when available, estimating, by the controller, a percentage tire life remaining and a mileage to end of tire life, and estimating, by the controller, a refined tire tread wear calibration coefficient for performing future indirect tire tread wear estimations. The method also includes generating, by the controller, based on an estimated error in a tire tread wear distribution, one of a first notification to an operator of the percentage tire life remaining and mileage to end of tire life and a second notification to an operator of an unavailability of the tire tread wear estimation and an instruction to the operator to perform the direct tire tread wear measurement.

In some aspects, the data fusion of the indirect tire tread wear estimation with the direct tire tread wear measurement includes performing, by the controller, a data fusion for a distribution of the indirect tire tread wear estimation with the direct tire tread wear measurements from tire tread grooves of the tire with a minimum tread depth remaining when the direct tire tread measurements are indicative of uneven wear.

In some aspects, the data fusion of the indirect tire tread wear estimation with the direct tire tread wear measurement includes performing, by the controller, a data fusion for a distribution of the indirect tire tread wear estimation with the direct tire tread wear measurements from all available direct measurements of tire tread depths when the direct tire tread measurements are indicative of uniform wear.

In some aspects, the indirect tire tread wear estimation uses a recursive weighted tire slip, wherein the recursive weighted tire slip includes an accumulated longitudinal and lateral tire slip and corner-based tire slip estimation normalized by a surface of the tire and based on sensor data including one or more of a vehicle velocity, a yaw rate, a steering angle, and a wheel speed.

In some aspects, the indirect tire tread wear estimation is calculated using a tire effective radius, a pressure and temperature correction factor, a tire width, a tire type correction factor, a longitudinal slippage weight factor, a lateral slippage weight factor, a calibration coefficient, a relative longitudinal velocity, and a relative lateral velocity.

In some aspects, the indirect tire tread wear estimation includes a correction factor that is a function of a tire tread depth.

In some aspects, the indirect tire tread wear estimation includes a correction factor that is a function of a wheel alignment to estimate an effect of uneven tire tread wear.

In some aspects, the indirect tire tread wear estimation is dependent on a relative longitudinal and lateral tire slip as represented by the calibration coefficient and is not directly a function of a normal load on the tire.

In some aspects, the method further includes combining, by the controller, indirect and direct tire tread wear measurement data from multiple vehicles with consideration to factors including one or more of geolocation, vehicle driving conditions, environment, vehicle type, tire type, and direct measurement method to further enhance an accuracy of the indirect tire tread wear estimation.

In another aspect of the present disclosure, a system for determining a tire tread wear estimation of a tire includes at least one sensor configured to generate sensor data indicative of a vehicle velocity, a yaw rate, a steering angle, a wheel speed, a tire pressure, and a tire temperature and a controller in electronic communication with the at least one sensor. The controller is configured to receive a direct tire tread wear measurement, perform an indirect tire tread wear estimation, and perform a data fusion of the indirect tire tread wear estimation with the direct tire tread wear measurement. The controller is further configured to estimate a percentage tire life remaining and a mileage to end of tire life and estimate a refined tire tread wear calibration coefficient for performing future indirect tire tread wear estimations. The controller is also configured to generate, based on an estimated error in a tire tread wear distribution, one of a first notification to an operator of the percentage tire life remaining and mileage to end of tire life and a second notification to the operator of an unavailability of the tire tread wear estimation and an instruction to the operator to perform the direct tire tread wear measurement.

In some aspects, performing the data fusion of the indirect tire tread wear estimation with the direct tire tread wear measurement includes performing, by the controller, a data fusion for a distribution of the indirect tire tread wear estimation with the direct tire tread wear measurements from tire tread grooves of the tire with a minimum tread depth remaining when the direct tire tread measurements are indicative of uneven wear.

In some aspects, the data fusion of the indirect tire tread wear estimation with the direct tire tread wear measurement includes performing, by the controller, a data fusion for a distribution of the indirect tire tread wear estimation with the direct tire tread wear measurements from all available direct measurements of tire tread depths when the direct tire tread measurements are indicative of uniform wear.

In some aspects, the indirect tire tread wear estimation uses a recursive weighted tire slip, wherein the recursive weighted tire slip includes an accumulated longitudinal and lateral tire slip and corner-based tire slip estimation normalized by a surface of the tire and based on sensor data including one or more of a vehicle velocity, a yaw rate, a steering angle, and a wheel speed.

In some aspects, the indirect tire tread wear estimation is calculated using a tire effective radius, a pressure and temperature correction factor, a tire width, a tire type correction factor, a longitudinal slippage weight factor, a lateral slippage weight factor, a linearity coefficient, a calibration coefficient, a relative longitudinal velocity, and a relative lateral velocity.

In some aspects, the indirect tire tread wear estimation includes a correction factor that is a function of a tire tread depth.

In some aspects, the indirect tire tread wear estimation includes a correction factor that is a function of a wheel alignment to estimate an effect of uneven tire tread wear.

In some aspects, the indirect tire tread wear estimation is dependent on a relative longitudinal and lateral tire slip as represented by the calibration coefficient and is not directly a function of a normal load on the tire.

In some aspects, the controller is further configured to receive indirect and direct tire tread wear measurement data from multiple vehicles via electronic communication with the controller to further enhance an accuracy of the indirect tire tread wear estimation.

In some aspects, the indirect and direct tire tread wear measurement data from multiple vehicles is combined with consideration to factors including one or more of geolocation, driving behavior classification, vehicle driving conditions, environment, vehicle type, tire type, and direct measurement method to further enhance the accuracy of the tire tread wear estimation.

In another aspect of the present disclosure, a method for determining a tire tread wear estimation of a tire includes receiving, by a controller, a direct tire tread wear measurement, when available, performing, by the controller, an indirect tire tread wear estimation, performing, by the controller, a data fusion of the indirect tire tread wear estimation with the direct tire tread wear measurement when available, estimating, by the controller, a percentage tire life remaining and a mileage to end of tire life, and estimating, by the controller, a refined tire tread wear calibration coefficient for performing future indirect tire tread wear estimations.

BRIEF DESCRIPTION OF THE DRAWINGS

The present disclosure will be described in conjunction with the following figures, wherein like numerals denote like elements.

FIG. 2 is a graphical illustration of a fusion of direct tire tread depth measurements with an indirect tire tread depth estimation, according to an embodiment.

FIG. 3 is a graphical illustration of a fusion of distributions of direct tire tread depth measurements with an indirect tire tread depth estimation, according to an embodiment.

Figure 1:
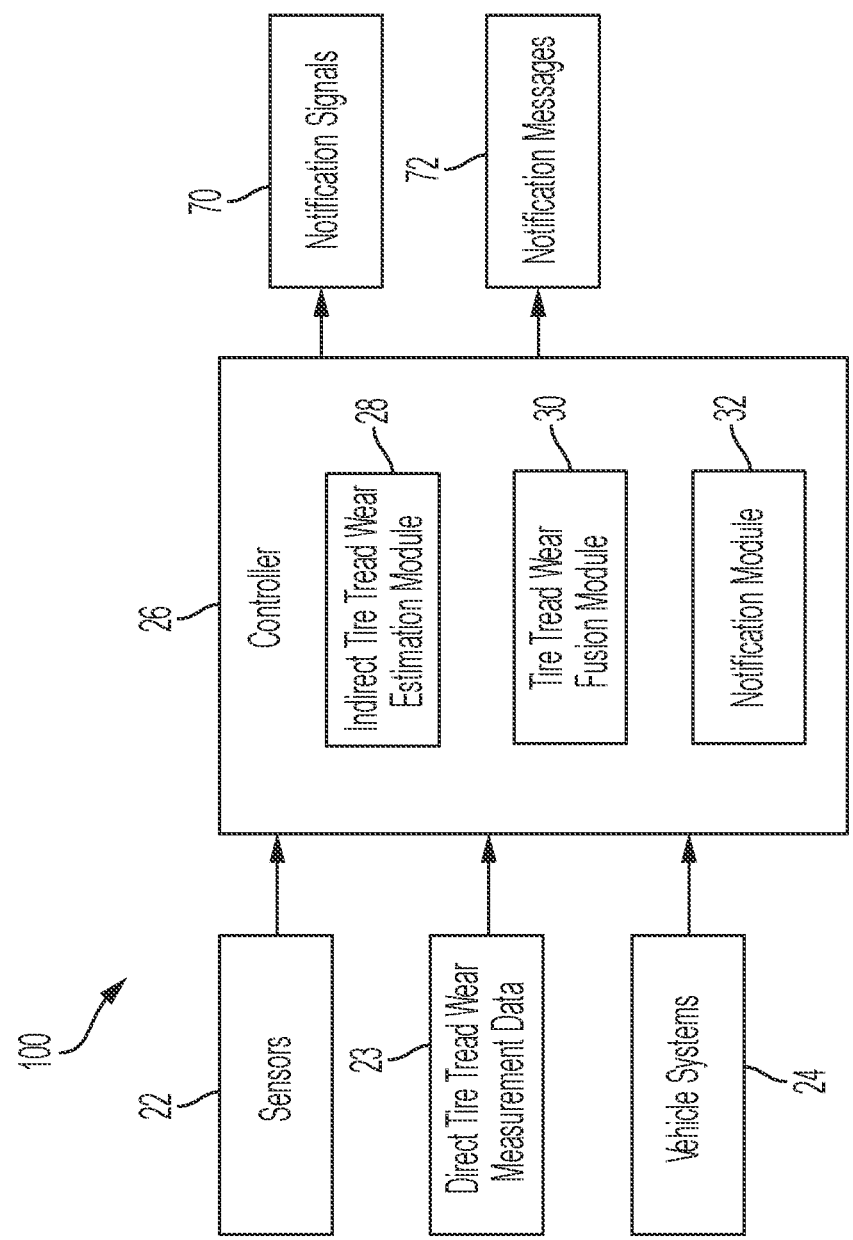
FIG. 1 is a schematic illustration of a system for estimating tire tread wear, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description. for the purpose of reference only, and thus are not intended to be limiting. For example, terms such as "above" and "below" refer to directions in the drawings to which reference is made. Terms such as "front," "back," "Left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in various embodiments.

The embodiments discussed herein provide systems and methods to estimate the tire tread wear at each vehicle corner in real-time. The method includes an indirect tire tread wear estimation and data fusion of the indirect estimation with occasional direct tire tread measurement. The indirect tire tread wear estimation calculates the accumulated weighted longitudinal and lateral tire slip (an accumulated longitudinal and lateral tire slip obtained from corner-based slip estimation and vehicle dynamics) normalized by the tread surface of the tire. This estimation uses available vehicle data without the input from specialized, tire-mounted sensors. The effect of the normal load has been incorporated into the tire slip-based estimation. The methods incorporate calibration factors that may be used to comprehend the effects of tire type, tire pressure, tire temperature, alignment, and other vehicle characteristics.

To enhance the accuracy of the indirect tire tread wear estimation, a data fusion framework fuses the indirect tire tread wear estimation with different direct measurement modalities using Bayesian filtering and weighted averaging, for example and without limitation. The data fusion framework corrects for errors in the indirect estimation that may be due to calibration parameter inaccuracies as well as uneven tire tread wear. The occasional direct measurements may be used to further adaptively adjust the tire tread wear calibration coefficients used in the indirect tire tread wear estimation. The tire tread wear estimation methods discussed herein provide correction of the tire tread wear estimate for different tire types and sizes (e.g., all season, winter, summer, tires from various manufacturers) as well as for tire pressure, temperature, and alignment.

A percentage tire life remaining and/or mileage to end of life can be provided to a user based on the improved accuracy and estimation of indirect wear rate over the tread life of the tire including near end of life. The methods discussed herein, including the fusion of the indirect tire tread wear estimation with the occasional direct measurements may be completed on the vehicle, such as in a vehicle controller, using edge computing, at a remote facility in communication with this vehicle and other vehicles, or any combination of the above.

Referring to FIG. 1, a schematic diagram of a system 100 for estimating tire tread depth illustrates various components of the system 100, according to an embodiment. In various embodiments, the system 100 includes a controller or control module 26. The controller 26 includes, in some embodiments, an indirect tire tread wear estimation module 28, a tire tread wear fusion module 30, and a notification module 32. The sub-modules shown in FIG. 1 may be combined and/or further partitioned to estimate the tire tread wear using a combination of indirect tire tread wear estimations and periodic direct tire tread wear measurements. While depicted as a single unit for illustrative purposes, the controller 26 may additionally include one or more other controllers, collectively referred to as a "controller." The controller 26 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 26 in controlling the vehicle.

In various embodiments, inputs to the controller 26 are received from one or more sensors 22, from direct tire tread wear measurement data 23, from one or more vehicle systems 24, and/or determined by other sub-modules (not shown) of the controller 26. The one or more sensors 22 are configured to sense observable conditions of the vehicle and generate sensor signals based thereon and may include inertial measurement unit (IMU), vehicle speed, steering wheel angle, tire pressure monitoring system (TPMS), GPS, RADAR, LIDAR, optical cameras, thermal cameras, ultrasonic sensors, and/or additional sensors as appropriate. The direct tire tread wear measurement data 23 is obtained, in some embodiments, by a direct, physical measurement, image data, and/or determined by other direct, real-time measurement means. The one or more vehicle systems 24 determine a condition associated with the vehicle and generate signals and/or messages based thereon. In various embodiments, the one or more vehicle systems 24 generate signals and/or messages indicating conditions of the vehicle. The vehicle systems 24 provide the signals and/or messages directly or indirectly through a communication bus (not shown) or other communication means.

The controller 26 receives the signals from the sensors 22, the direct tire tread wear measurement data 23, and the signals and/or messages from the vehicle systems 24 and determines an indirect tire tread wear estimate. Using the indirect tire tread wear estimate and the direct tire tread wear measurement data 23, the controller 26 performs calculations to fuse the direct tire tread wear measurement data 23 with the indirect tire tread wear estimate to generate an improved tire tread wear estimate, percentage of tire tread wear remaining, and/or mileage to end of life. The controller 26 selectively notifies a user of the percentage of tire tread wear remaining and/or mileage to end of life and/or when the tires should be changed. The controller 26 notifies the user through visual, audible, and/or haptic feedback within the vehicle and/or messages sent to remote devices (i.e., email messages, text messages, etc.).

Tire tread wear is a result of relative motion, known as slip, between the tire and the road surface. The indirect tire tread wear estimation module 28 receives sensor data from the one or more sensors 22 and vehicle systems data from the vehicle systems 24. The sensor data and vehicle systems data includes, for example and without limitation, velocity, lateral and longitudinal acceleration, wheel speed, tire pressure, tire temperature, and steering angle. The indirect tire tread wear distribution estimation module 28 uses a low-computational-intensive, indirect, real-time method to estimate tire tread wear using a recursive weighted tire slip (an accumulated longitudinal and lateral tire slip obtained from corner-based slip estimation and vehicle dynamics normalized by the tread surface of the tire).

The indirect tire tread wear distribution for each tire at each corner is estimated using the below Equation 1 as:

$$T_{tire\ tread\ wear_{ij}} = \frac{\int_0^t \left(K_{PT_{ij}}(t)\sqrt{K_x|V_{rx_{ij}}|^\gamma + K_y|V_{ry_{ij}}|^\gamma}\right)dt}{R_{eff_{ij}}W_{t_{ij}}} K_{t_{ij}}$$

Where:
i represents the axle and j represents the position of the tire on the vehicle
$R_{eff_{ij}}$=Tire effective radius
$W_{t_{ij}}$=Tire width
$K_x$=Longitudinal slippage weight factor
$K_y$=Lateral Slippage weight factor
$V_{rx_{ij}}$=Relative longitudinal velocity
$V_{ry_{ij}}$=Relative lateral velocity
$\gamma$=Calibration coefficient
$K_{PT_{ij}}$=Pressure and temperature correction factor
$K_{t_{ij}}$=Tire type correction factor The indirect tire tread wear distribution (where $\mu_{tire\ tread\ wear}$ is the mean value of the tire tread wear distribution and $\sigma_{T_{tire\ tread\ wear}}$ is the covariance of the tire tread wear distribution) uses available vehicle data (e.g., velocity, wheel speed, steering angle, yaw rate, tire pressure, etc.)

obtained from the sensors 22 and/or the vehicle systems 24. In some embodiments, the tire type correction factor ($K_{t_{ij}}$) may be normalized based on testing data at the tread block row level. In various embodiments, the tire type correction factor ($K_{t_{ij}}$) is a function of the tire tread depth. In various embodiments, the tire type correction factor ($K_{t_{ij}}$) is a function of wheel alignment. Alignment information may be based on initial factory settings and an alignment monitor and/or based on periodic alignment inspections.

Since the effect of the normal load on tire tread wear is considered in the longitudinal and lateral slippage calculation, the indirect tire tread wear estimation is independent of the normal load. To clarify this, in one embodiment as an example, where the vehicle is modeled as a single track vehicle, the relative lateral velocity $V_{ry_{ij}}$ can be calculated using the lateral velocity, which is proportional to the ratio of the lateral force versus the tire slip angle. This proportionality has been captured by the calibration coefficient $\gamma$ in Equation 1 above. When the normal load increases, the aforementioned ratio will increase, which leads to increase in the lateral velocity, and as the result, the relative lateral velocity $V_{ry_{ij}}$ increases, or vice versa.

The tire tread wear fusion module 30 receives as inputs the indirect tire tread wear estimation obtained for each tire as calculated above and if available periodic direct tire tread wear measurements. The indirect tire tread wear estimate is prone to accumulated errors due to inaccuracies in calibration parameters, such as, for example and without limitation, tire type correction factors and uneven tire tread wear. With increased time in use, that is, with increased time in service of the of tire and/or increased mileage on the tire, the uncertainty around the estimation increases. A direct tire tread measurement, such as a tire tread gauge measurement (for example, direct contact, laser based or vision based methods), is used to increase the accuracy of the indirect tire tread wear estimation. Fusing the direct tire tread wear measurement with the indirect tire tread wear estimate is accomplished using Bayesian filtering and weighted averaging, for example and without limitation, to reduce accumulated inaccuracies in the indirect tire tread wear estimation.

With continued reference to FIG. 1, the notification determination module 32 receives as input the percentage tire life remaining and/or the mileage to end of tire life, both of which are determined from the fusion of the indirect tire tread wear estimation with the direct tire tread wear measurement when available. The notification determination module 32 generates notification signals 70 and/or notification messages 72 to notify the user of an estimated life remaining of each tire of the vehicle. In various embodiments, the notification signals 70 and/or messages 72 include a message or other indication (e.g., audio or haptic) that it is time to change one or more of the tires.

In various embodiments, the notification determination module 32 generates the notification signals 70 and/or messages 72 at a time that may be more convenient for the user. For example, the notification determination module 32 may receive as input vehicle health data and/or behavior data. The notification determination module 32 coordinates the delivery and/or content of the notification signals 70 and/or messages 72 based on the vehicle health data and/or the behavior data.

With reference to FIGS. 2 and 3, tire tread depth is graphically illustrated as a function of time in use or mileage. A new tire has a tread depth as illustrated by the line 202. A worn tire, that is, a tire at the end of life, has a tread depth as illustrated by the line 204. The actual or true tire tread depth is illustrated by the line 206. The indirect tire tread wear estimation as calculated using the equation above is illustrated by the line 208. As shown in FIG. 2, the indirect tire tread wear estimation (line 208) deviates from the true tire tread depth (line 206) over time or mileage, resulting in an inaccurate tire tread wear estimate. To correct for the inaccuracy, a direct tire tread wear measurement may be made, illustrated by the line 210. The fusion between the direct tire tread wear measurement with the indirect tire tread wear estimation results in an estimate that is much closer to the true tire tread depth. FIG. 3 illustrates the fusion of the direct tire tread wear measurement with the indirect tire tread wear estimation. In an exemplary embodiment, the fusion of these two distributions is accomplished using the equation:

$$\text{bel}(x_t) = \eta p(z_t | x_t) \overline{\text{bel}}(x_1) \qquad \text{Equation 2}$$

As shown in FIG. 2, both the slope (indicative of the calibration coefficients) and the distribution of the indirect tire tread wear estimation are corrected using the data fusion framework presented by Equation 2.

With reference to FIG. 3, the indirect tire tread wear estimation, $\overline{\text{bel}}(x_t)$, is illustrated as line 302. The direct tire tread wear measurement, $p(z_t | x_t)$, is illustrated as line 304. Bayesian filtering uses the distribution of the estimation (mean value and standard distribution) and that of the direct measurement and fuses them together to the line 306 that represents the fused direct tire tread wear measurement data with the lower uncertainty $\text{bel}(x_t)$. $\eta$ is the normalization factor. In various embodiments, the indirect tire tread wear estimation is fused with the minimum of distribution of the direct tire tread depth measurement.

If the distribution of the indirect tire tread wear estimation and the direct tire tread wear measurements are Gaussian, that is, $p(z_t | x_t) = N_1(\mu_1, \sigma_1)$ and $\overline{\text{bel}}(x_t) = N_0(\mu_0, \sigma_0)$, then $\text{bel}(x_t) = N(\mu, \sigma)$. The resulting distribution is expressed as:

$$\mu' = \mu_0 + k(\mu_1 - \mu_0)$$

$$\sigma'^2 = \sigma_0^2 - k\sigma_0^2$$

$$k = \frac{\sigma_0^2}{\sigma_0^2 + \sigma_1^2}$$

The covariance of the indirect estimation is an indication of its distribution uncertainty. Since as time goes by, this uncertainty grows, it could be used to provide not only context to the user in terms of accuracy, but also indicate the need for additional discrete direct measurements.

Figure 4:
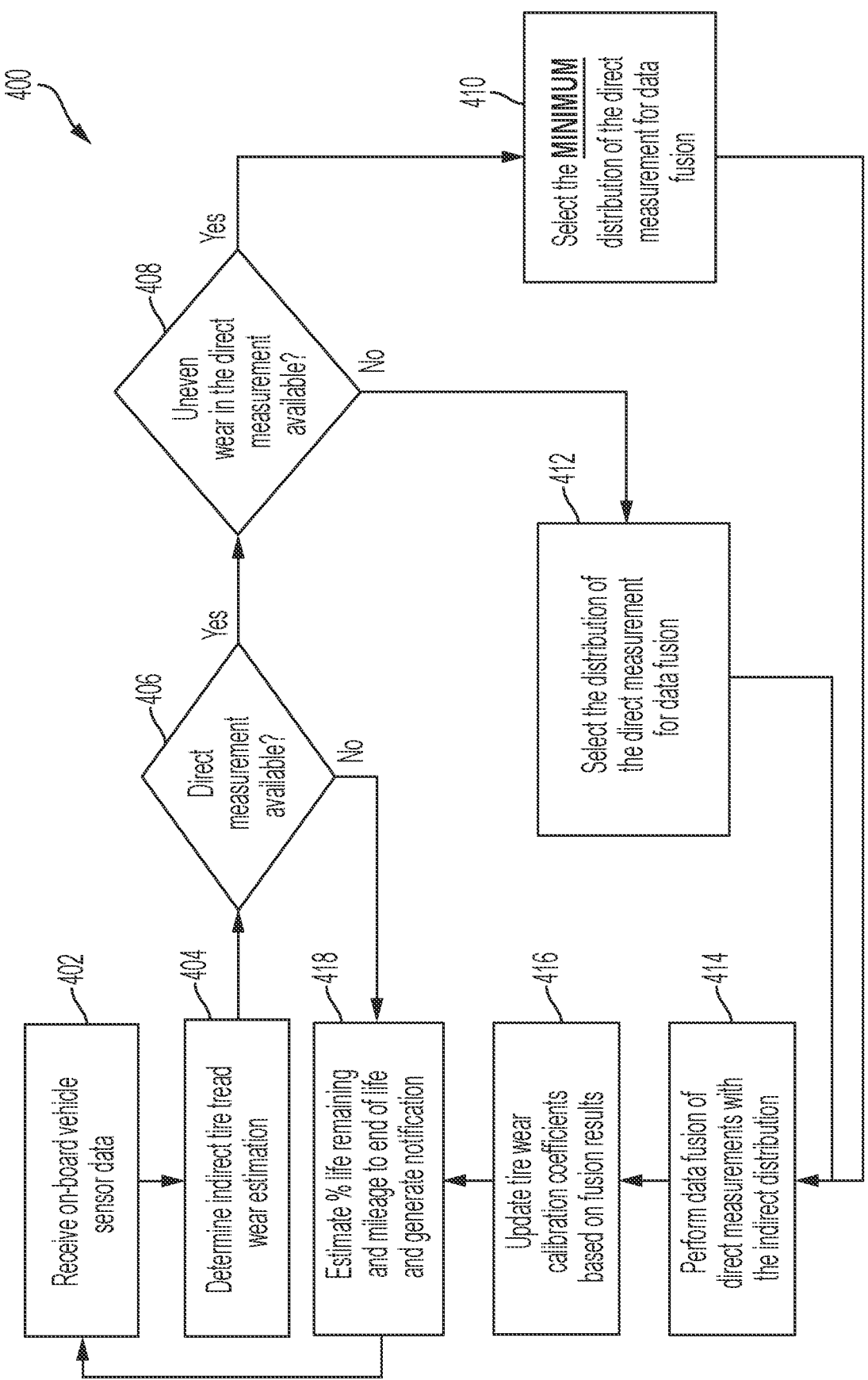
FIG. 4 is a flow chart diagram of a method for estimating tire tread wear, according to an embodiment.

FIG. 4 illustrates a method 400 to estimate tire tread wear, according to an embodiment. The method 400 may be performed for each tire of a vehicle. The method 400 can be utilized in connection with the system 100 discussed herein. The method 400 can be utilized in connection with the controller 26 as discussed herein, or by other systems associated with or separate from the vehicle, in accordance with exemplary embodiments. The order of operation of the method 400 is not limited to the sequential execution as illustrated in FIG. 4, but may be performed in one or more varying orders, or steps may be performed simultaneously, as applicable in accordance with the present disclosure.

At 402, the controller 26 receives sensor data from the plurality of sensors 22 and vehicle dynamics data from the vehicle systems 24, including velocity, lateral and longitudinal acceleration at each corner of the vehicle, wheel speed, tire pressure, tire temperature, and tire alignment, for example and without limitation. The controller 26 also receives direct tire tread wear measurement data, if available.

Next, at 404, the indirect tire tread wear estimation module 28 of the controller 26 calculates the indirect tire tread wear mean and covariance estimation using the sensor data and vehicle dynamics data as discussed herein. In various embodiments, the indirect tire tread wear estimation is calculated using a tire effective radius, a pressure and temperature correction factor, a tire width, a tire type correction factor, a longitudinal slippage weight factor, a lateral slippage weight factor, a calibration coefficient, a relative longitudinal velocity, and a relative lateral velocity.

The method 400 proceeds to 406, wherein the controller 26 determines if a direct tire tread wear measurement is available. When the determination at 406 is no, that is, there is not a direct tire tread wear measurement available, the method 400 proceeds to 418 and continues as discussed below. When the determination at 406 is positive or yes, that is, there is a direct tire tread wear measurement available, the method 400 proceeds to 408.

At 408, the controller 26 determines if there is indication of uneven wear in the direct tire tread wear measurement data. When this determination is positive, that is, the direct tire tread wear measurement indicates uneven tire tread wear, the method 400 proceeds to 410. At 410, the method 400 selects the minimum distribution of the direct measured data from the tire tread grooves with the maximum tire tread wear and proceeds to 414. When the determination at 408 is negative, that is, the direct tire tread wear measurement does not indicate uneven tire tread wear (that is, the direct tire tread wear measurement is indicative of uniform wear), the method 400 proceeds to 412. At 412, the method 400 selects the direct measured data from all available direct measurements of tire tread depths and proceeds to 414.

At 414, the tire tread wear fusion module 30 of the controller 26 performs data fusion using the direct tire tread wear measurement and the indirect tire tread wear estimation distribution from block 404. This data fusion process fuses the direct tire tread wear measurement distributions from blocks 410 or 412, as determined, with the indirect tire tread wear estimation distribution using fusion methods previously discussed.

At 416, the controller 26 compares the direct tire tread wear measurement data to the indirect tire tread wear estimation to adaptively adjust or refine the tire tread wear calibration coefficients used to perform future indirect tire tread wear estimations.

Next, at 418, the controller 26 estimates the percentage life remaining of the tires and mileage to end of life of the tires. If the covariance of the indirect and/or fused distribution is less than a threshold (that is, estimated errors are below a threshold), the notification module 32 of controller 26 will generate a notification signal and/or notification message with the percentage life remaining of the tires and mileage to end of life of the tires. If the covariance of the indirect and/or fused distribution is greater than or equal to a threshold (that is, estimated errors are equal to or above a threshold), the notification module 32 of controller 26 will generate a notification signal and/or notification message that the wear state of the tire or tires is unavailable. In various embodiments, when the covariance of the indirect and or fused distribution is greater than or equal to a threshold, the notification module 32 of the controller 26 generates a notification signal and/or notification message to instruct or trigger the operator to initiate a direct measurement to reduce errors in the tire tread wear estimations. The method 400 then returns to 402 and proceeds as discussed herein.

While the method 400 is discussed as performed by a controller 26 of the vehicle, in various embodiments the method 400 is performed, either in part or fully, by edge computing, back office cloud, or any combination of onboard and offboard computing resources or controllers. Additionally, the method 400 may be performed in part or in whole by edge computing or back office cloud computing, and the indirect and direct tire tread wear data from multiple vehicles, with consideration to factors including one or more of geolocation, driving behavior classification, vehicle driving conditions, environment, vehicle type, tire type, and direct measurement method may be combined to further enhance the accuracy of the tire tread wear estimations. In various embodiments, the data may combined in the back office cloud, by edge computing, or on board, or any combination thereof. In various embodiments, the controller 26 is further configured to receive modified correction factors based on indirect and direct tire tread wear measurement data from multiple vehicles via electronic communication with the controller 26 to further enhance an accuracy of the tire tread wear estimation.

The direct tire tread wear measurement modalities include, but are not limited to, 3D laser scanning, caliper gauge measurement, image data, or other optical-based sensing tools, including a cellphone camera or other camera. Data fusion methods and corrections include but are not limited to Bayesian filtering approaches including Kalman filter, information filter, histogram filter, particle filter and weight averaging. Direct measurement data may be inputted to the fusion algorithm using a number of means including cloud-based data synchronization or manual input methods, among others.

Advantages of the fusion framework discussed herein include increased prediction accuracy in the operation space adjacent to direct measurement modalities. For example, end of life prediction accuracy is improved with direct measurement modalities taken toward the end of tire life.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fail within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, hut may be approximated and/or larger or smaller, as desired, reflecting acceptable tolerances, conversion factors, rounding off, measurement error and the like and other factors known to those of skill in the art. The term "substantially" means that the recited characteristic. parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for determining a tire tread wear estimation of a tire, comprising:
   receiving, by a controller, sensor data from one or more vehicle sensors in communication with the controller, wherein the controller includes a memory configured to store executable instructions to be used by the controller, and a microprocessor in communication with the memory to execute the stored executable instructions;
   receiving, by the controller, vehicle dynamics data from one or more vehicle systems in communication with the controller;
   receiving, by the controller, a direct tire tread wear measurement;
   performing, by the controller, an indirect tire tread wear estimation using the sensor data and the vehicle dynamics data received by the controller;
   performing, by the controller, a data fusion of the indirect tire tread wear estimation with the direct tire tread wear measurement received by the controller, wherein the data fusion is one of the executable instructions;
   estimating, by the controller, a percentage tire life remaining and a mileage to end of tire life based on the data fusion performed by the controller;
   estimating, by the controller, a refined tire tread wear calibration coefficient for performing future indirect tire tread wear estimations; and
   generating, by the controller, based on an estimated error in a tire tread wear distribution, one of a first notification to an operator of the percentage tire life remaining and mileage to end of tire life and a second notification to an operator of an unavailability of the tire tread wear estimation and an instruction to the operator to perform the direct tire tread wear measurement.

2. The method of claim 1, wherein the data fusion of the indirect tire tread wear estimation with the direct tire tread wear measurement comprises performing, by the controller, a data fusion for a distribution of the indirect tire tread wear estimation with the direct tire tread wear measurements from tire tread grooves of the tire with a minimum tread depth remaining when the direct tire tread wear measurements are indicative of uneven wear.

3. The method of claim 1, wherein the data fusion of the indirect tire tread wear estimation with the direct tire tread wear measurement comprises performing, by the controller, a data fusion for a distribution of the indirect tire tread wear estimation with the direct tire tread wear measurements from all available direct measurements of tire tread depths when the direct tire tread wear measurements are indicative of uniform wear.

4. The method of claim 1, wherein the indirect tire tread wear estimation uses a recursive weighted tire slip, wherein the recursive weighted tire slip includes an accumulated longitudinal and lateral tire slip and corner-based tire slip estimation normalized by a surface of the tire and based on sensor data including one or more of a vehicle velocity, a yaw rate, a steering angle, and a wheel speed.

5. The method of claim 4, wherein the indirect tire tread wear estimation is calculated using a tire effective radius, a pressure and temperature correction factor, a tire width, a tire type correction factor, a longitudinal slippage weight factor, a lateral slippage weight factor, a calibration coefficient, a relative longitudinal velocity, and a relative lateral velocity.

6. The method of claim 5, wherein the indirect tire tread wear estimation includes a correction factor that is a function of a tire tread depth.

7. The method of claim 5, wherein the indirect tire tread wear estimation includes a correction factor that is a function of a wheel alignment to estimate an effect of uneven tire tread wear.

8. The method of claim 5, wherein the indirect tire tread wear estimation is dependent on a relative longitudinal and lateral tire slip as represented by the calibration coefficient and is not directly a function of a normal load on the tire.

9. The method of claim 1, further comprising combining, by the controller, indirect and direct measurement data from multiple vehicles with consideration to factors including one or more of geolocation, driving behavior classification, vehicle driving conditions, environment, vehicle type, tire type, and direct measurement method to further enhance an accuracy of the tire tread wear estimation.

10. A system for determining a tire tread wear estimation of a tire, comprising:
at least one sensor configured to generate sensor data indicative of a vehicle velocity, a yaw rate, a steering angle, a wheel speed, a tire pressure, and a tire temperature; and
a controller including a memory configured to store executable instructions, and a microprocessor, in communication with the memory, configured to execute the stored executable instructions, the controller configured to
receive a direct tire tread wear measurement;
perform an indirect tire tread wear estimation based on the sensor data generated;
perform a data fusion of the indirect tire tread wear estimation with the direct tire tread wear measurement, wherein the data fusion is one of the executable instructions;
estimate a percentage tire life remaining and a mileage to end of tire life based on the data fusion;
estimate a refined tire tread wear calibration coefficient for performing future indirect tire tread wear estimations; and
generate, based on an estimated error in a tire tread wear distribution, one of a first notification to an operator of the percentage tire life remaining and mileage to end of tire life and a second notification to the operator of an unavailability of the tire tread wear estimation and an instruction to the operator to perform the direct tire tread wear measurement.

11. The system of claim 10, wherein performing the data fusion of the indirect tire tread wear estimation with the direct tire tread wear measurement comprises performing, by the controller, a data fusion for a distribution of the indirect tire tread wear estimation with the direct tire tread wear measurements from tire tread grooves of the tire with a minimum tread depth remaining when the direct tire tread wear measurements are indicative of uneven wear.

12. The system of claim 10, wherein the data fusion of the indirect tire tread wear estimation with the direct tire tread wear measurement comprises performing, by the controller, a data fusion for a distribution of the indirect tire tread wear estimation with the direct tire tread wear measurements from all available direct measurements of tire tread depths when the direct tire tread wear measurements are indicative of uniform wear.

13. The system of claim 10, wherein the indirect tire tread wear estimation uses a recursive weighted tire slip, wherein the recursive weighted tire slip includes an accumulated longitudinal and lateral tire slip and corner-based tire slip estimation based normalized by a surface of the tire and based on sensor data including one or more of a vehicle velocity, a yaw rate, a steering angle, and a wheel speed.

14. The system of claim 13, wherein the indirect tire tread wear estimation is calculated using a tire effective radius, a pressure and temperature correction factor, a tire width, a tire type correction factor, a longitudinal slippage weight factor, a lateral slippage weight factor, a calibration coefficient, a relative longitudinal velocity, and a relative lateral velocity.

15. The system of claim 10, wherein the indirect tire tread wear estimation includes a correction factor that is a function of a tire tread depth.

16. The system of claim 10, wherein the indirect tire tread wear estimation includes a correction factor that is a function of a wheel alignment to estimate an effect of uneven tire tread wear.

17. The system of claim 10, wherein the indirect tire tread wear estimation is dependent on a relative longitudinal and lateral tire slip as represented by the calibration coefficient and is not directly a function of a normal load on the tire.

18. The system of claim 10, wherein the controller is further configured to receive indirect and direct tire tread wear measurement data from multiple vehicles via electronic communication with the controller to further enhance an accuracy of the tire tread wear estimation.

19. The system of claim 18, wherein the indirect and direct tire tread wear measurement data from multiple vehicles is combined with consideration to factors including one or more of geolocation, driving behavior classification, vehicle driving conditions, environment, vehicle type, tire type, and direct measurement method to further enhance the accuracy of the tire tread wear estimation.

20. A method for determining a tire tread wear estimation of a tire, comprising:
receiving, by a controller, a direct tire tread wear measurement;
performing, by the controller, an indirect tire tread wear estimation, wherein the indirect tire tread wear estimation is based on sensor data received from one or more vehicle sensors, and vehicle dynamic data received from one or more vehicle systems;
performing, by the controller, a data fusion of the indirect tire tread wear estimation with the direct tire tread wear measurement;
estimating, by the controller, a percentage tire life remaining and a mileage to end of tire life based on the data fusion performed by the controller; and
estimating, by the controller, a refined tire tread wear calibration coefficient for performing future indirect tire tread wear estimations.

* * * * *